United States Patent
Higuchi et al.

(10) Patent No.: US 12,313,940 B2
(45) Date of Patent: May 27, 2025

(54) LIQUID CRYSTAL OPTICAL ELEMENT COMPRISING AN ALIGNMENT CONTROL LAYER HAVING A PLURALITY OF CONVEX BODIES

(71) Applicant: Japan Display Inc., Tokyo (JP)

(72) Inventors: Ayaka Higuchi, Tokyo (JP); Shinichiro Oka, Tokyo (JP); Koichi Igeta, Tokyo (JP); Junji Kobashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/760,488

(22) Filed: Jul. 1, 2024

(65) Prior Publication Data

US 2025/0013102 A1    Jan. 9, 2025

(30) Foreign Application Priority Data

Jul. 5, 2023  (JP) ................. 2023-110760

(51) Int. Cl.
*G02F 1/1337* (2006.01)
*G02F 1/13363* (2006.01)

(52) U.S. Cl.
CPC .. *G02F 1/133757* (2021.01); *G02F 1/133636* (2013.01)

(58) Field of Classification Search
CPC ............. G02F 1/133636; G02F 1/133757
See application file for complete search history.

(56) References Cited

U.S. PATENT DOCUMENTS

| | | | |
|---|---|---|---|
| 2007/0019141 A1* | 1/2007 | Kizu | G02F 1/13378 349/123 |
| 2007/0195118 A1* | 8/2007 | Iwata | B41J 3/543 347/12 |
| 2016/0033698 A1 | 2/2016 | Escuti et al. | |
| 2022/0113460 A1* | 4/2022 | Komura | G02B 5/3016 |

FOREIGN PATENT DOCUMENTS

| | | | | |
|---|---|---|---|---|
| JP | 2009098537 A | * | 5/2009 | ........... G02F 1/1323 |
| JP | 2009258768 A | * | 11/2009 | ......... G02F 1/13362 |
| JP | 2017522601 A | | 8/2017 | |

* cited by examiner

*Primary Examiner* — Paul C Lee
(74) *Attorney, Agent, or Firm* — Maier & Maier, PLLC (57) ABSTRACT

According to one embodiment, a liquid crystal optical element includes a transparent substrate having a first main surface, an alignment control layer having a plurality of convex bodies, and a liquid crystal layer having a cholesteric liquid crystal. The alignment control layer has a first alignment area in which the convex bodies are arranged at a first pitch, and a second alignment area in which the convex bodies are arranged at a second pitch. The second pitch is less than the first pitch. The liquid crystal layer has a first liquid crystal area which overlaps the first alignment area, and a second liquid crystal area which overlaps the second alignment area.

9 Claims, 11 Drawing Sheets

LIQUID CRYSTAL OPTICAL ELEMENT COMPRISING AN ALIGNMENT CONTROL LAYER HAVING A PLURALITY OF CONVEX BODIES

CROSS-REFERENCE TO RELATED APPLICATIONS

This application is based upon and claims the benefit of priority from Japanese Patent Application No. 2023-110760, filed Jul. 5, 2023, the entire contents of which are incorporated herein by reference.

FIELD

Embodiments described herein relate generally to a liquid crystal optical element.

BACKGROUND

For example, a liquid crystal polarization grating using a liquid crystal material is suggested. In this liquid crystal polarization grating, to realize the desired optical performance, various parameters such as a grating period, the refractive anisotropy of a liquid crystal layer (the difference between refractive index ne for extraordinary light and refractive index no for ordinary light in a liquid crystal layer) and the thickness of the liquid crystal layer are adjusted.

In liquid crystal optical elements in which light is guided while repeating total reflection inside a transparent substrate, the prevention of a light guiding loss in which light leaks to the outside is required.

DETAILED DESCRIPTION

Embodiments described herein aim to provide a liquid crystal optical element in which a light guiding loss can be prevented.

In general, according to one embodiment, a liquid crystal optical element comprises a transparent substrate having a first main surface, an alignment control layer which is provided on the first main surface and has a plurality of convex bodies, and a liquid crystal layer which is provided on the alignment control layer and has a cholesteric liquid crystal. The alignment control layer has a first alignment area in which the convex bodies are arranged at a first pitch, and a second alignment area in which the convex bodies are arranged at a second pitch. The second pitch is less than the first pitch. The liquid crystal layer has a first liquid crystal area which overlaps the first alignment area and which has a first reflective surface inclining at a first angle relative to the first main surface, and a second liquid crystal area which overlaps the second alignment area and which has a second reflective surface inclining at a second angle relative to the first main surface. The second angle is greater than the first angle.

According to another embodiment, a liquid crystal optical element comprises a transparent substrate which has a first main surface, an alignment control layer provided on the first main surface, and a liquid crystal layer which is provided on the alignment control layer and has a cholesteric liquid crystal. The liquid crystal layer has a first liquid crystal area which has a first reflective surface inclining at a first angle relative to the first main surface, and a second liquid crystal area which has a second reflective surface inclining at a second angle relative to the first main surface. A helical pitch of the cholesteric liquid crystal contained in the first liquid crystal area is equal to a helical pitch of the cholesteric liquid crystal contained in the second liquid crystal area. The second angle is different from the first angle.

The embodiments can provide a liquid crystal optical element in which a light guiding loss can be prevented.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the drawings, in order to facilitate understanding, an X-axis, a Y-axis and a Z-axis orthogonal to each other are shown depending on the need. A direction parallel to the X-axis is referred to as a first direction X. A direction parallel to the Y-axis is referred to as a second direction Y. A direction parallel to the Z-axis is referred to as a third direction Z. The plane defined by the X-axis and the Y-axis is referred to as an X-Y plane. The plane defined by the X-axis and the Z-axis is referred to as an X-Z plane. The plane defined by the Y-axis and the Z-axis is referred to as a Y-Z plane.

Figure 1:
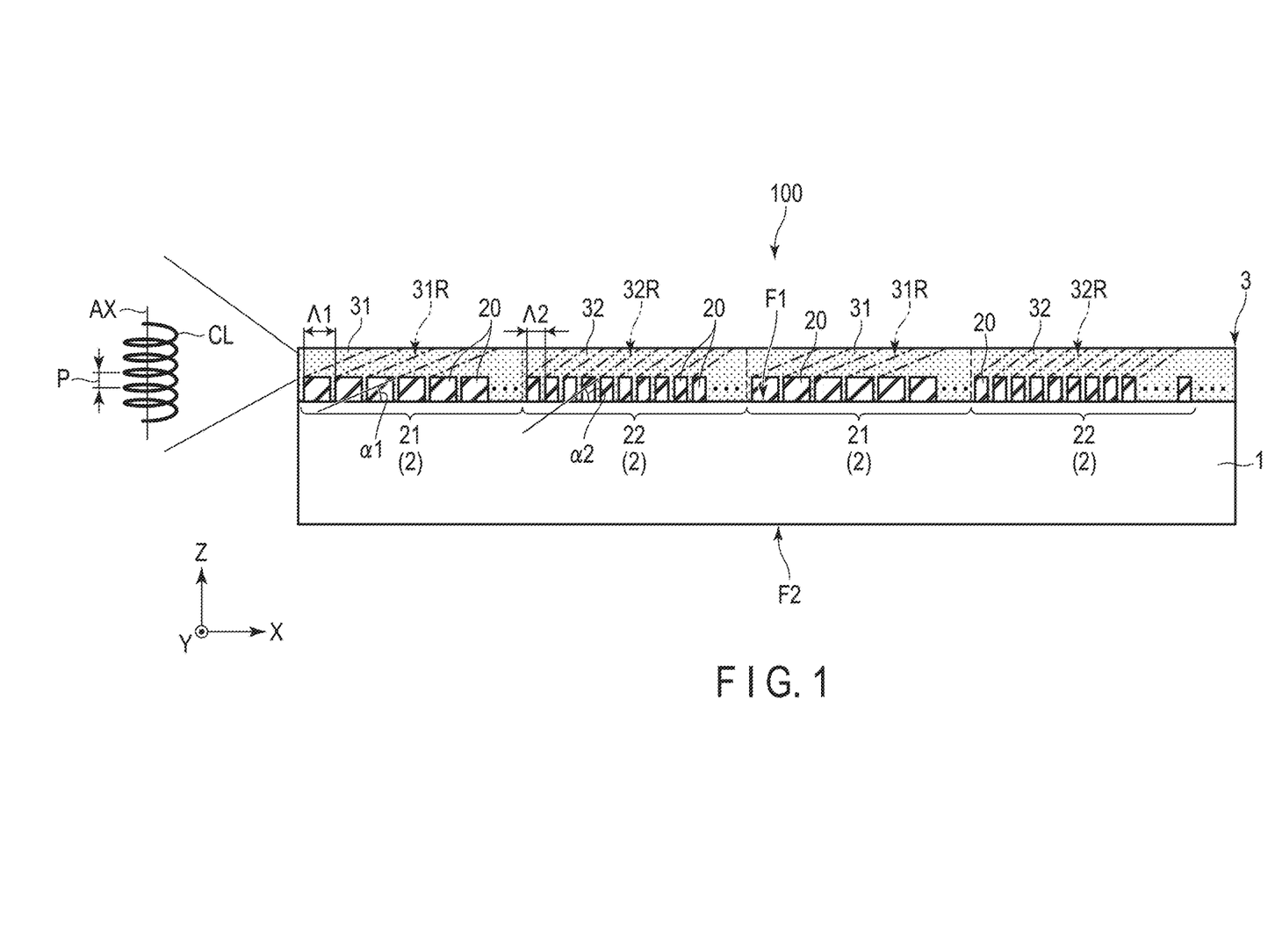
FIG. 1 is a cross-sectional view schematically showing a configuration example of a liquid crystal optical element 100.

FIG. 1 is a cross-sectional view schematically showing a configuration example of a liquid crystal optical element 100.

The liquid crystal optical element 100 comprises a transparent substrate 1, an alignment control layer 2 and a liquid crystal layer 3.

The transparent substrate 1 consists of, for example, a transparent glass plate or a transparent synthetic resin plate. The transparent substrate 1 may consist of, for example, a transparent synthetic resin plate having flexibility. The transparent substrate 1 could have an arbitrary shape. For example, the transparent substrate 1 may be curved.

In this specification, the term "light" includes visible light and invisible light. For example, the wavelength of the lower limit of the visible light range is greater than or equal to 350 nm and less than or equal to 400 nm. The wavelength of the upper limit of the visible light range is greater than or equal to 700 nm and less than or equal to 830 nm. Visible light includes the first component (blue component) of a first wavelength range (for example, 400 to 500 nm), the second component (green component) of a second wavelength range (for example, 500 to 600 nm), and the third component (red component) of a third wavelength range (for example, 600 to 700 nm). Invisible light includes ultraviolet light having a wavelength range in which the wavelength is shorter than the first wavelength range, and infrared light having a wavelength range in which the wavelength is longer than the third wavelength range.

In this specification, the term "transparent" should preferably mean "colorless and transparent". However, the term "transparent" may mean "semitransparent" or "colored and transparent".

The transparent substrate 1 is shaped like a flat plate parallel to an X-Y plane and has a first main surface (inner surface) F1 and a second main surface (outer surface) F2. The first main surface F1 and the second main surface F2 are surfaces substantially parallel to an X-Y plane and face each other in a third direction Z.

The alignment control layer 2 is provided on the first main surface F1. The alignment control layer 2 has a plurality of tiny convex bodies 20. Each of the convex bodies 20 extends from the first main surface F1 in the third direction Z. These convex bodies 20 function to define the alignment direction of the liquid crystal molecules contained in the liquid crystal layer 3 as described later.

The alignment control layer 2 has first alignment areas 21 in which a plurality of convex bodies 20 are arranged in a first direction X at a first pitch Λ1, and second alignment areas 22 in which a plurality of convex bodies 20 are arranged in the first direction X at a second pitch Λ2. The first and second alignment areas 21 and 22 are alternately arranged in the first direction X. The first pitch Λ1 and the second pitch Λ2 are different from each other. In the example shown in the figure, the second pitch Λ2 is less than the first pitch Λ1.

The liquid crystal layer 3 is provided on the alignment control layer 2 in the third direction Z and covers each of the convex bodies 20. The liquid crystal layer 3 has a cholesteric liquid crystal CL which twists in a first twist direction as schematically shown in the enlarged view. The cholesteric liquid crystal CL has a helical axis AX substantially parallel to the third direction Z and has a helical pitch P parallel to the third direction Z. The helical pitch P indicates one period of the helix (in other words, the layer thickness parallel to the helical axis AX and required for a 360-degree rotation of the liquid crystal molecule).

The liquid crystal layer 3 has first liquid crystal areas 31 which overlap the first alignment areas 21 and second liquid crystal areas 32 which overlap the second alignment areas 22. The first and second liquid crystal areas 31 and 32 are alternately arranged in the first direction X. Each first liquid crystal area 31 has a first reflective surface 31R which inclines at a first angle α1 relative to the first main surface F1. Each second liquid crystal area 32 has a second reflective surface 32R which inclines at a second angle α2 relative to the first main surface F1. The first angle α1 and the second angle α2 are different from each other. In the example shown in the figure, the second angle α2 is greater than the first angle α1.

The first reflective surface 31R and the second reflective surface 32R reflect, of the incident light on the liquid crystal layer 3, circularly polarized light in a selective reflection range determined based on the helical pitch P of the cholesteric liquid crystals CL and the refractive anisotropy Δn of the liquid crystal layer 3. The selective reflection range may be a specific wavelength of visible light or may be invisible light such as ultraviolet light or infrared light.

For example, when the first twist direction is right-handed, right-handed circularly polarized light is reflected on the first reflective surface 31R and the second reflective surface 32R. When the first twist direction is left-handed, left-handed circularly polarized light is reflected on the first reflective surface 31R and the second reflective surface 32R. In this specification, reflection in the liquid crystal layer 3 is accompanied by diffraction inside the liquid crystal layer 3. In this specification, circularly polarized light may be strict circularly polarized light or may be circularly polarized light which approximates elliptically polarized light.

This liquid crystal optical element 100 is configured to reflect, for example, part of light which enters the liquid crystal optical element 100 from the transparent substrate 1 side on the first and second reflective surfaces 31R and 32R of the liquid crystal layer 3 toward the transparent substrate 1. The light reflected on the first reflective surface 31R and the second reflective surface 32R propagates in the second direction Y while repeating reflection on the interface between the transparent substrate 1 and an air layer and the interface between the liquid crystal layer 3 and an air layer. This liquid crystal optical element 100 functions as a light guide element for the selective reflection range.

It should be noted that a liquid crystal layer which contains another cholesteric liquid crystal may be stacked in the liquid crystal layer 3 shown in FIG. 1 in the liquid crystal optical element 100. Such a cholesteric liquid crystal is, for example, a cholesteric liquid crystal having a helical pitch which is different from the helical pitch P shown in the figure or a cholesteric liquid crystal which twists in a second twist direction opposite to the first twist direction.

Figure 2:
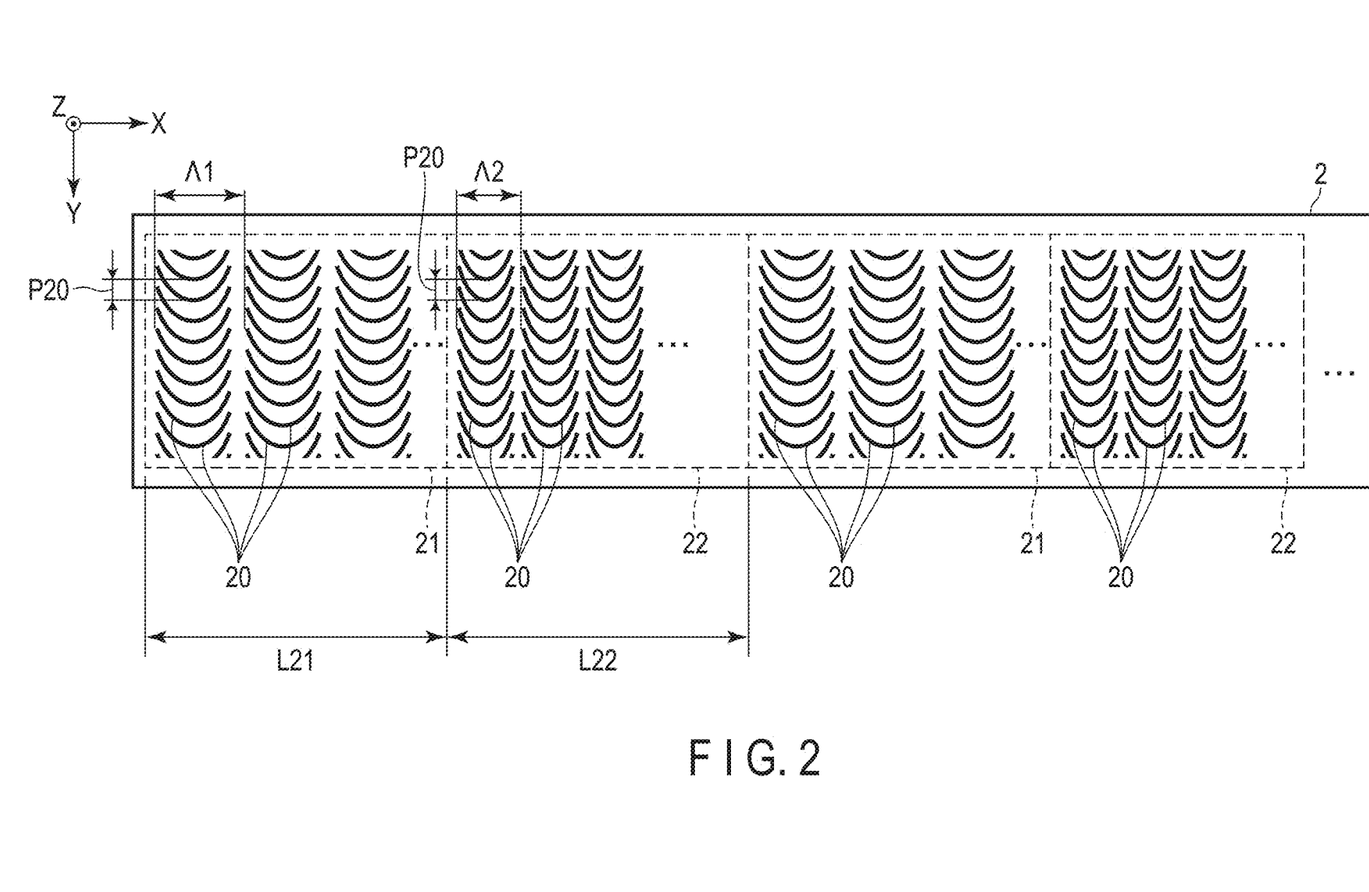
FIG. 2 is a plan view showing an example of the alignment control layer 2 shown in FIG. 1.

FIG. 2 is a plan view showing an example of the alignment control layer 2 shown in FIG. 1.

In each first alignment area 21, the convex bodies 20 are formed into arch-like shapes which are curved in a similar manner as seen in plan view. The convex bodies 20 are arrayed in the first direction X and a second direction Y. The first pitch Λ1 of the convex bodies 20 which are adjacent to each other in the first direction X is different from pitch P20 of the convex bodies 20 which are adjacent to each other in the second direction Y. For example, the first pitch Λ1 is greater than pitch P20. Width L21 of each first alignment area 21 in the first direction X is an integral multiple of the first pitch Λ1.

In each second alignment area 22, the convex bodies 20 are formed into arch-like shapes which are curved in a similar manner as seen in plan view. It should be noted that the shapes of the convex bodies 20 of each second alignment area 22 are different from those of the convex bodies 20 of each first alignment area 21. The convex bodies 20 are arrayed in the first direction X and the second direction Y. The second pitch Λ2 of the convex bodies 20 which are adjacent to each other in the first direction X is different from pitch P20 of the convex bodies 20 which are adjacent to each other in the second direction Y. For example, the second pitch Λ2 is greater than pitch P20. In the example shown in the figure, pitch P20 of each first alignment area 21 is equal to pitch P20 of each second alignment area 22. However, they may be different from each other. Width L22 of each second alignment area 22 in the first direction X is an integer multiple of the second pitch Λ2. Width L22 is equal to width L21 or greater than width L21.

Figure 3:
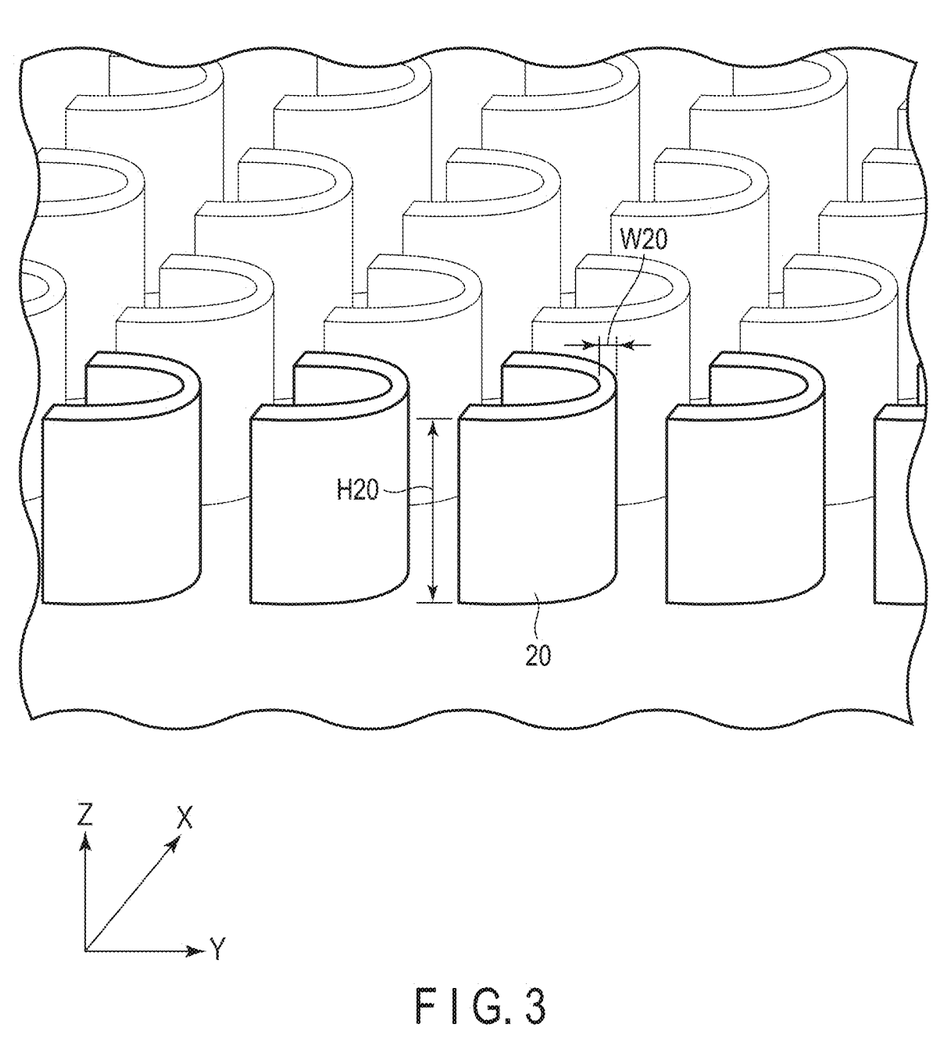
FIG. 3 is a diagram showing an example of the shape of each convex body 20.

FIG. 3 is a diagram showing an example of the shape of each convex body 20.

Each convex body 20 is formed of, for example, an organic material. However, each convex body 20 may be formed of an inorganic material. The refractive index of each convex body 20 is equal to that of the transparent substrate 1. Thus, the light which reached the interface between the transparent substrate 1 and the convex bodies 20 is not substantially refracted.

Each convex body 20 has substantially a constant height H20 in the third direction Z. Height H20 is greater than width W20 of each convex body 20. To define the alignment direction of liquid crystal molecules, height H20 should be preferably great. Height H20 is, for example, greater than or equal to the quadruple of width W20. For example, width W20 is 100 nm, and height H20 is 400 nm.

Figure 4:
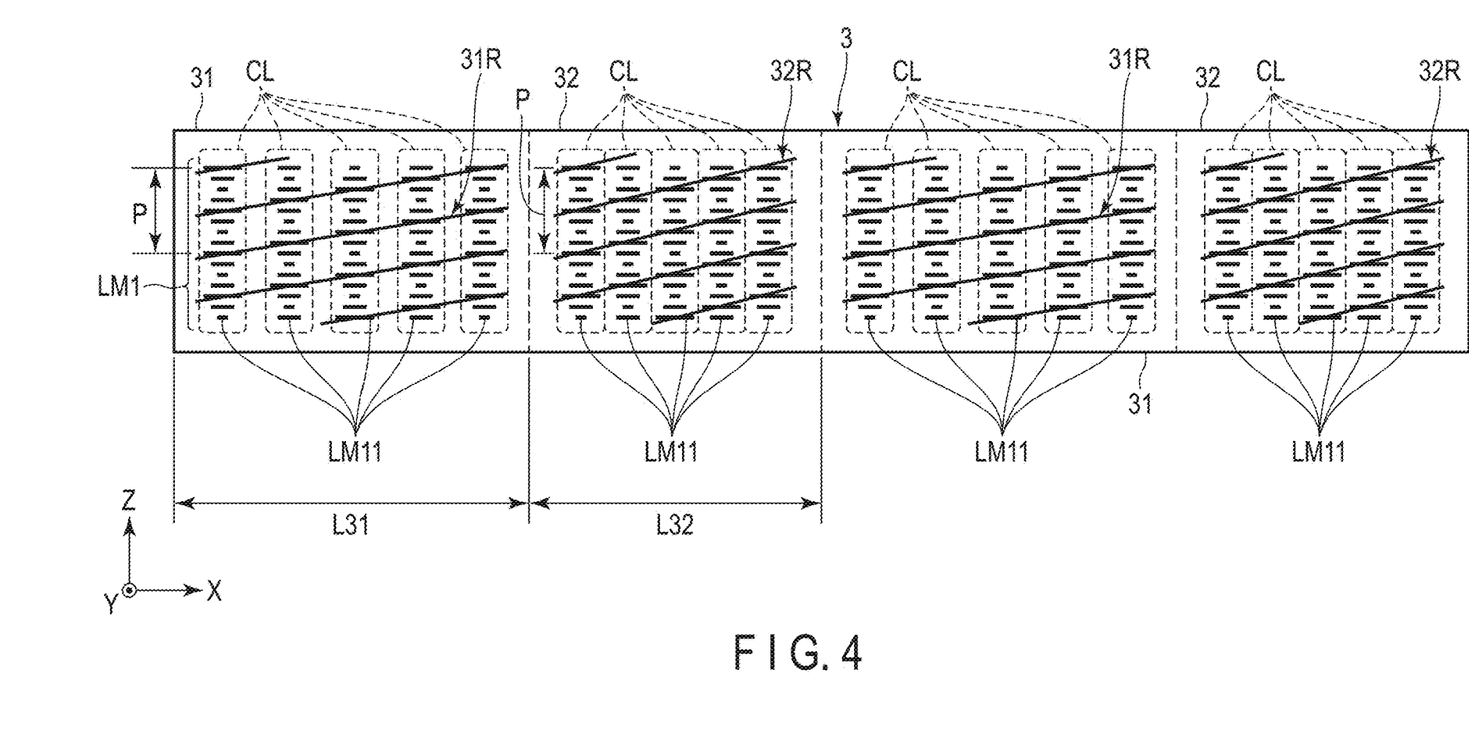
FIG. 4 is a diagram for explaining an example of the cholesteric liquid crystals CL contained in a liquid crystal layer 3.

FIG. 4 is a diagram for explaining an example of the cholesteric liquid crystals CL contained in the liquid crystal layer 3.

In FIG. 4, the liquid crystal layer 3 is enlarged in the third direction Z. In addition, to simplify the illustration, FIG. 4 shows one liquid crystal molecule LM1 among the liquid crystal molecules located in the same plane parallel to an X-Y plane as the liquid crystal molecules LM1 constituting each cholesteric liquid crystal CL. The alignment direction of each liquid crystal molecule LM1 shown in the figure corresponds to the average alignment direction of the liquid crystal molecules located in the same plane.

Width L31 of each first liquid crystal area 31 in the first direction X is equal to width L21 of each first alignment area 21 shown in FIG. 2. Width L32 of each second liquid crystal area 32 in the first direction X is equal to width L22 of each second alignment area 22 shown in FIG. 2.

The cholesteric liquid crystals CL contained in each first liquid crystal area 31 and the cholesteric liquid crystals CL contained in each second liquid crystal area 32 twist in the same direction and have the same helical pitch P.

When one of the cholesteric liquid crystals CL surrounded by dotted lines is particularly looked at, the cholesteric liquid crystal CL consists of a plurality of liquid crystal molecules LM1 which are helically stacked in the third direction Z while twisting. The liquid crystal molecules LM1 have a liquid crystal molecule LM11 on an end side of the cholesteric liquid crystal CL.

In the liquid crystal layer 3, the alignment directions of the cholesteric liquid crystals CL which are adjacent to each other in the first direction X are different from each other. Further, the spacial phases of the cholesteric liquid crystals CL which are adjacent to each other in the first direction X are different from each other.

The alignment directions of the liquid crystal molecules LM11 which are adjacent to each other in the first direction X are different from each other. The alignment directions of the liquid crystal molecules LM11 continuously change in the first direction X. The alignment directions of the liquid crystal molecules LM11 are described later.

The first reflective surface 31R and the second reflective surface 32R incline with respect to an X-Y plane. Here, each of the reflective surface 31R and the second reflective surface 32R corresponds to a surface in which the alignment directions of the liquid crystal molecules LM1 are uniform, or a surface (an equiphase wave surface) in which the spacial phase is uniform.

This liquid crystal layer 3 is cured in a state where the alignment directions of the liquid crystal molecules LM1 are fixed. In other words, an electric field does not control the alignment directions of the liquid crystal molecules LM1. For this reason, the liquid crystal optical element 100 does not comprise an electrode for forming an electric field in the liquid crystal layer 3.

In general, in the liquid crystal layer 3 having cholesteric liquid crystals CL, the selective reflection range Δλ for the light which underwent perpendicular incidence is shown by the following formula (1) based on the helical pitch P of the cholesteric liquid crystals CL and the refractive anisotropy Δn of the liquid crystal layer 3 (the difference between refractive index ne for extraordinary light and refractive index no for ordinary light).

$$\Delta\lambda = \Delta n * P \qquad (1)$$

The specific wavelength range of the selective reflection range Δλ is greater than or equal to (no*P) and less than or equal to (ne*P).

The center wavelength λm of the selective reflection range Δλ is shown by the following formula (2) based on the helical pitch P of the cholesteric liquid crystals CL and the average refractive index nav (=(ne+no)/2) of the liquid crystal layer 3.

$$\lambda m = nav * P \qquad (2)$$

Figure 5:
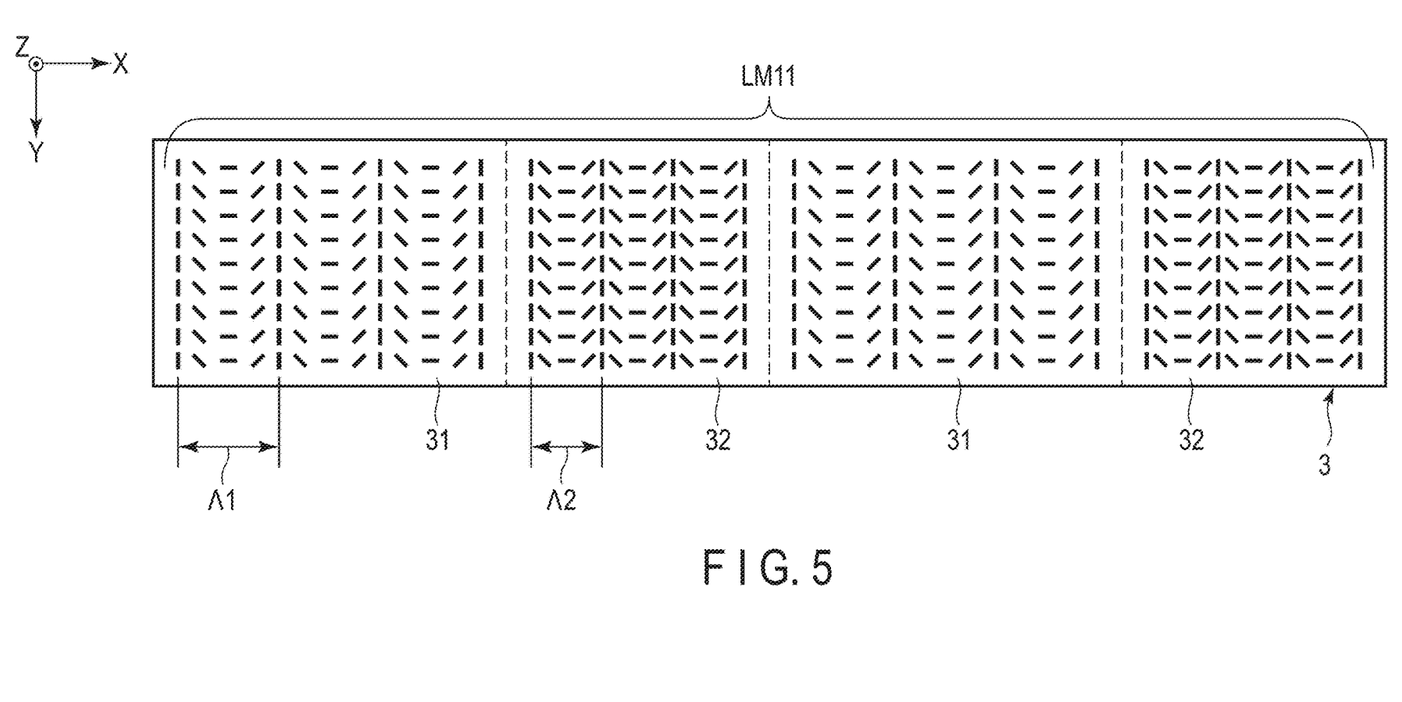
FIG. 5 is a plan view schematically showing the alignment pattern of liquid crystal molecules in the liquid crystal layer 3.

FIG. 5 is a plan view schematically showing the alignment pattern of liquid crystal molecules in the liquid crystal layer 3.

Here, the figure shows the alignment pattern of the liquid crystal molecules LM11 located on an end side of the cholesteric liquid crystals CL among the liquid crystal molecules LM1 contained in the cholesteric liquid crystals CL.

The alignment directions of the liquid crystal molecules LM11 which are arranged in the first direction X are different from each other. To the contrary, the alignment directions of the liquid crystal molecules LM11 which are arranged in the second direction Y are substantially coincident with each other.

Here, regarding the liquid crystal molecules LM11 arranged in the first direction X, the alignment direction varies with each liquid crystal molecule LM11 by a certain degree. In other words, the alignment direction linearly varies with the liquid crystal molecules LM11 arranged in the first direction X. Thus, the spacial phase linearly varies in the first direction X with the cholesteric liquid crystals CL arranged in the first direction X. As a result, the first and second reflective surfaces 31R and 32R which incline with respect to an X-Y plane are formed as in the case of the liquid crystal layer 3 shown in FIG. 4. Here, the phrase "linearly vary" means that, for example, the amount of variation in the alignment directions of the liquid crystal molecules LM11 is shown by a linear function. Here, the alignment direction of each liquid crystal molecule LM11 corresponds to the long axis direction of the liquid crystal molecule LM11 in an X-Y plane. The alignment directions of the liquid crystal molecules LM11 can be controlled by the convex bodies 20 of the alignment control layer 2.

The interval between two liquid crystal molecules LM11 in the first direction X when the alignment directions of the liquid crystal molecules LM11 vary by 180 degrees in the first direction X in a plane is defined as pitch Λ. For example, in each first liquid crystal area 31, the alignment direction varies by a certain angle counterclockwise with each liquid crystal molecule LM11 from the left side to the right side of the figure. Pitch Λ1 of each first liquid crystal area 31 is coincident with the first pitch Λ1 of each first alignment area 21 shown in FIG. 2. Pitch Λ2 of each second liquid crystal area 32 is coincident with the second pitch Λ2 of each second alignment area 22 shown in FIG. 2.

The first angle α1 of the first reflective surface 31R of each first liquid crystal area 31 shown in FIG. 1 is set based on the first pitch Λ1 and the helical pitch P. Similarly, the second angle α2 of the second reflective surface 32R of each second liquid crystal area 32 shown in FIG. 1 is set based on the second pitch Λ2 and the helical pitch P.

The liquid crystal optical element 100 described above is formed by, for example, the following method.

First, an ultraviolet curing resinous material is applied to the upper side of the transparent substrate 1. Subsequently, a mold in which recess portions corresponding to the shapes of the convex bodies 20 are formed is prepared. The mold is laid to overlap the resinous material, and is irradiated with ultraviolet light while pressure is applied. By this process, the resinous material is cured into a shape corresponding to the recess portions of the mold, and thus, the convex bodies 20 are formed.

Subsequently, a liquid crystal material (a solution containing a monomer material for forming cholesteric liquid crystals CL) is applied to the upper side of the alignment control layer 2. Subsequently, the solvent is removed by decompressing the inside of the chamber. The applied liquid crystal material is dried, and is further baked. By this process, the liquid crystal molecules contained in the liquid crystal material are aligned in predetermined directions based on the shapes of the convex bodies 20. For example, among the liquid crystal molecules LM1, the liquid crystal molecules LM11 located near the first main surface F1 are horizontally aligned so as to be parallel to an X-Y plane and are further aligned such that their long axes are parallel to the tangents of the convex bodies 20 between the adjacent convex bodies 20. The other liquid crystal molecules LM1 located immediately above each liquid crystal molecule LM11 are helically stacked in the third direction Z while twisting based on the liquid crystal molecule LM11. Thus, the alignment directions of the liquid crystal molecules LM1 are fixed based on the alignment directions of the liquid crystal molecules LM11.

Subsequently, the liquid crystal material is cooled to approximately a room temperature, and the liquid crystal material is cured by irradiating it with ultraviolet light. By this process, the liquid crystal layer 3 having cholesteric liquid crystals CL is formed.

Now, this specification considers the optimal ranges of width L21 of the first alignment area 21 and width L22 of the second alignment area 22.

Figure 6:
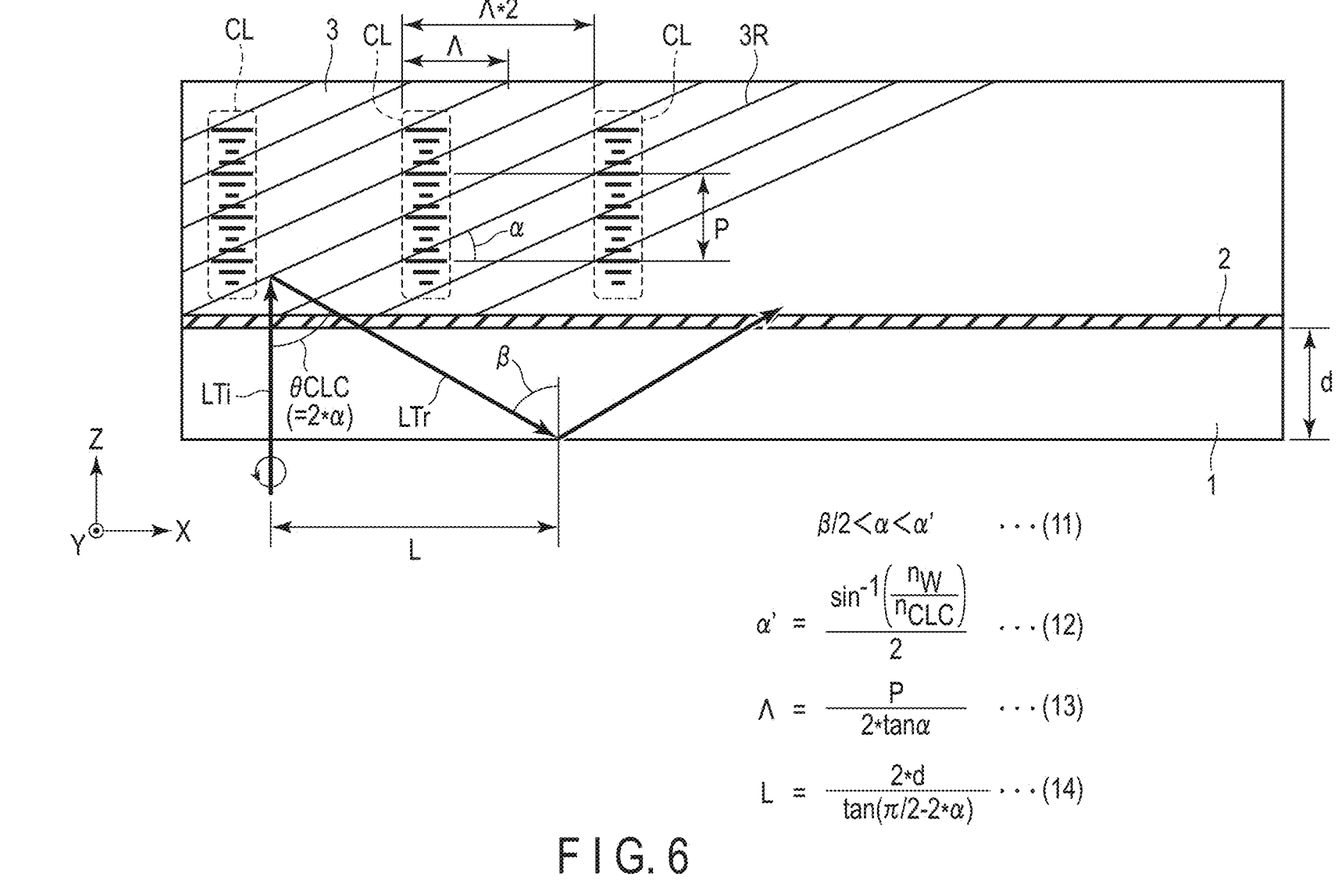
FIG. 6 is a diagram for explaining the optimal ranges of width L21 and width L22.

FIG. 6 is a diagram for explaining the optimal ranges of width L21 and width L22.

It is assumed that the transparent substrate 1 has thickness d in the third direction Z and has refractive index nw. Although details are omitted, the convex bodies are assumed to be arranged at pitch Λ in the alignment control layer 2. The liquid crystal layer 3 is assumed to have refractive index nCLC. Each cholesteric liquid crystal CL is assumed to have the helical pitch P. A reflective surface 3R is assumed to incline at angle α.

Here, it is assumed that light LTi which is circularly polarized light enters the transparent substrate 1 along the normal of the transparent substrate 1. Light LTi passes through the transparent substrate 1 and the alignment control layer 2. Subsequently, light Lti enters the liquid crystal layer 3 and is reflected and refracted on the reflective surface 3R. Light LTr reflected on the reflective surface 3R enters the transparent substrate 1 again and reaches the interface between the transparent substrate 1 and the air layer. The incident angle of light Ltr which reaches the interface is greater than a critical angle. Therefore, light LTr is totally reflected on the interface.

The angle between light LTi and light LTr at this time is defined as the diffraction angle θCLC of light. The diffraction angle θCLC corresponds to twice angle α.

As shown by relational expression (11) of the figure, angle α is set so as to be greater than ½ of the critical angle β and less than a critical inclination angle α'.

The critical inclination angle α' is defined by expression (12) of the figure. Specifically, if α' is solved based on conditions for totally reflecting light LTr on the interface between the liquid crystal layer 3 and the transparent substrate 1 when light LTr which is reflected at the diffraction angle θCLC(=2*α') on the reflective surface 3R proceeds to the transparent substrate 1 from the liquid crystal layer 3, expression (12) is obtained. It should be noted that the presence of the alignment control layer 2 is ignored here.

In sum, in order to cause light Ltr reflected on the reflective surface 3R to enter the transparent substrate 1 without being totally reflected on the interface between the liquid crystal layer 3 and the transparent substrate 1, angle α should be set so as to be less than the critical inclination angle α'.

Pitch Λ is shown by expression (13) of the figure.

Distance L in the first direction X between the incident position of light LTi and the position at which light LTr is totally reflected on the interface between the transparent substrate 1 and the air layer is shown by expression (14) of the figure.

Angle α of the figure can be replaced by the first angle α1 and the second angle α2 described above. Pitch Λ can be replaced by the first pitch Λ1 and the second pitch Λ2 described above.

Here, the first alignment area 21 and the first liquid crystal area 31 are considered.

The first angle α1 of the first reflective surface 31R is set so as to be greater than ½ of the critical angle β and less than the critical inclination angle α' based on relational expression (11).

The first pitch Λ1 is shown as P/(2*tan α1) based on expression (13).

Width L21 of the first alignment area 21 and width L31 of the first liquid crystal area 31 are set so as to be less than or equal to twice length L1 defined by the following expression based on expression (14).

$$L1 = 2*d/\tan(\pi/2 - 2*\alpha 1)$$

Now, the second alignment area 22 and the second liquid crystal area 32 are considered.

The second angle α2 of the second reflective surface 32R is set so as to be greater than ½ of the critical angle β and less than the critical inclination angle α' based on relational expression (11).

The second pitch Λ2 is shown as P/(2*tan α2) based on expression (13).

Width L22 of the second alignment area 22 and width L32 of the second liquid crystal area 32 are set so as to be less than or equal to twice length L2 defined by the following expression based on expression (14).

$$L2 = 2*d/\tan(\pi/2 - 2*\alpha 2)$$

Figure 7:
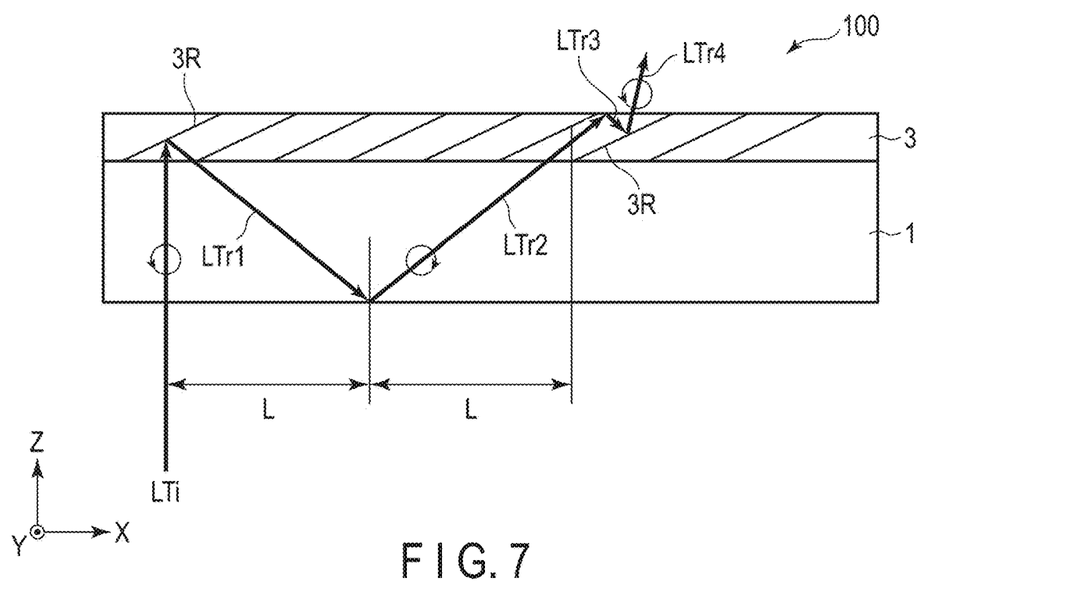
FIG. 7 is a diagram showing a comparative example.

Here, this specification explains the grounds for setting width L21 and width L31 so as to be less than or equal to twice length L1 and setting width L22 and width L32 so as to be less than or equal to twice length L2 with reference to the comparative example of FIG. 7.

In the comparative example, the liquid crystal layer 3 has reflective surfaces 3R which incline uniformly. It should be noted that the illustration of the alignment control layer is omitted here.

Light LTi which enters the transparent substrate 1 is, for example, left-handed circularly polarized light. Light LTi is reflected on the reflective surface 3R and enters the transparent substrate 1 as light LTr1 while maintaining the polarization state. Light LTr1 is reflected on the interface between the transparent substrate 1 and the air layer, is converted into right-handed circularly polarized light and enters the liquid crystal layer 3 again as light LTr2. Since light LTr2 is circularly polarized light which rotates in a direction opposite to light LTi, light LTr2 is not reflected on the liquid crystal layer 3, and is reflected on the interface between the liquid crystal layer 3 and the air layer. Light LTr3 reflected on the interface is left-handed circularly polarized light. Thus, light LTr3 is reflected on the reflective surface 3R. At this time, when light LTr4 reflected on the reflective surface 3R reaches the interface between the liquid crystal layer 3 and the air layer at an incident angle which is less than the critical angle, light LTr4 leaks out of the liquid crystal optical element 100. This light leakage causes a light guiding loss.

The distance in the first direction X from the position at which light LTi enters the transparent substrate 1 to the position at which light LTr2 reflected on the interface between the transparent substrate 1 and the air layer enters the liquid crystal layer 3 again corresponds to 2*L.

According to the embodiment described above, width L31 of the first liquid crystal area 31 having the first reflective surface 31R is less than or equal to twice length L1, and width L32 of the second liquid crystal area 32 having the second reflective surface 32R is less than or equal to twice length L2.

Therefore, when light LTi is reflected on the first reflective surface 31R of the first liquid crystal area 31, light LTr2 reflected on the interface between the transparent substrate 1 and the air layer enters the second liquid crystal area 32. In the second liquid crystal area 32, the second reflective surface 32R inclines at an angle different from the first reflective surface 31R. Thus, when light LTr3 is reflected on the second reflective surface 32R, the probability that the incident angle of light LTr4 is outside the conditions of total reflection can be reduced, and thus, the leakage of light can be prevented.

Similarly, when light LTi is reflected on the second reflective surface 32R of the second liquid crystal area 32, light LTr2 reflected on the interface between the transparent substrate 1 and the air layer enters the first liquid crystal area 31. In the first liquid crystal area 31, when light LTr3 is reflected on the first reflective surface 31R, the probability that the incident angle of light LTr4 is outside the conditions of total reflection can be reduced, and thus, the leakage of light can be prevented.

In this manner, a light guiding loss can be prevented.

Implementation Examples

When refractive index nw of the transparent substrate 1 is 1.5, and refractive index nCLC of the liquid crystal layer 3 is approximately 1.7, and the helical pitch P is approximately 570 nm, the critical inclination angle α' is approximately 29°. The critical angle β for air is approximately 42°. Thus, the first angle α1 and the second angle α2 are set so as to be greater than 21° and less than 29° based on relational expression (11) and expression (12) shown in FIG. 6.

When the first angle α1 and the second angle α2 are in this range, the first pitch Λ1 and the second pitch Λ2 are set so as to be greater than or equal to approximately 510 nm and less than or equal to approximately 750 nm based on expression (13) shown in FIG. 6. For example, to set the first angle α1 to 21°, the first pitch Λ1 is set to 750 nm. To set the second angle α2 to 29°, the second pitch Λ2 is set to 510 nm.

When thickness d of the transparent substrate 1 is 10 mm, width L21 of each first alignment area 21 and width L31 of each first liquid crystal area 31 are set so as to be less than or equal to 36 mm, and width L22 of each second alignment area 22 and width L32 of each second liquid crystal area 32 are set so as to be less than or equal to 64 mm. It should be noted that width L21 and width L31 should be less than or equal to (2*L1), and width L22 and width L32 should be less than or equal to (2*L2). Therefore, all of width L21, width L31, width L22 and width L32 may be set so as to be equal to each other, and may be set to, for example, 35 mm.

Hereinafter, this specification explains several modified examples regarding the layout of the convex bodies in each first alignment area 21 and each second alignment area 22.

Figure 8:
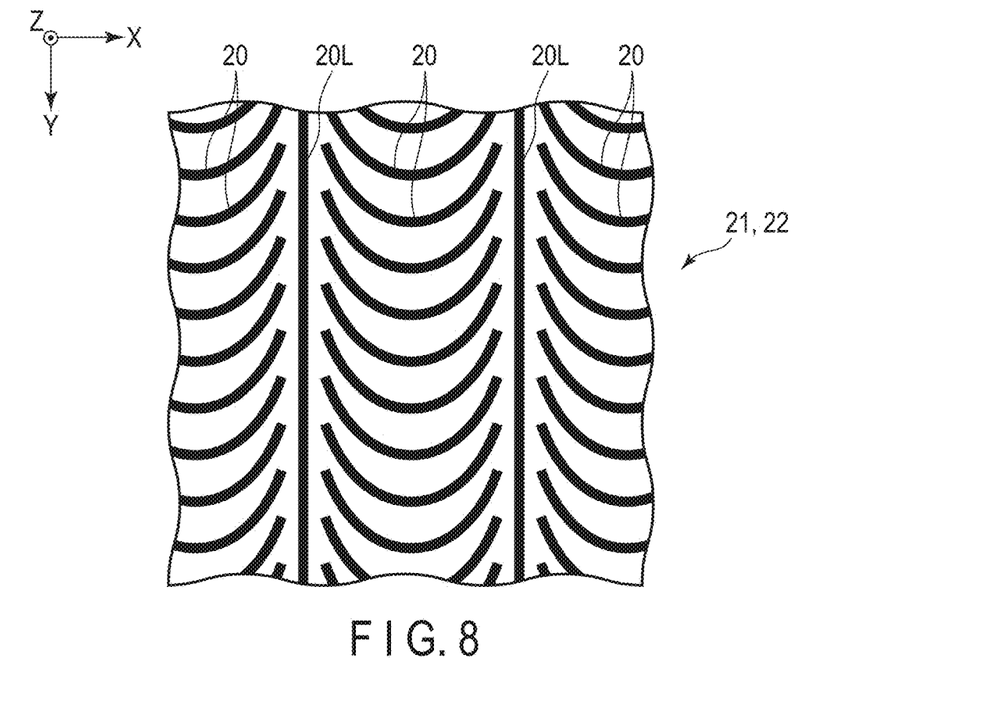
FIG. 8 is a plan view showing modified example 1 of the convex bodies.

FIG. 8 is a plan view showing modified example 1 of the convex bodies.

In modified example 1, convex bodies 20L which linearly extend in the second direction Y are provided in addition to the arch-like convex bodies 20 shown in FIG. 2. Each convex body 20L is located between the convex bodies 20 which are adjacent to each other in the first direction X.

Figure 9:
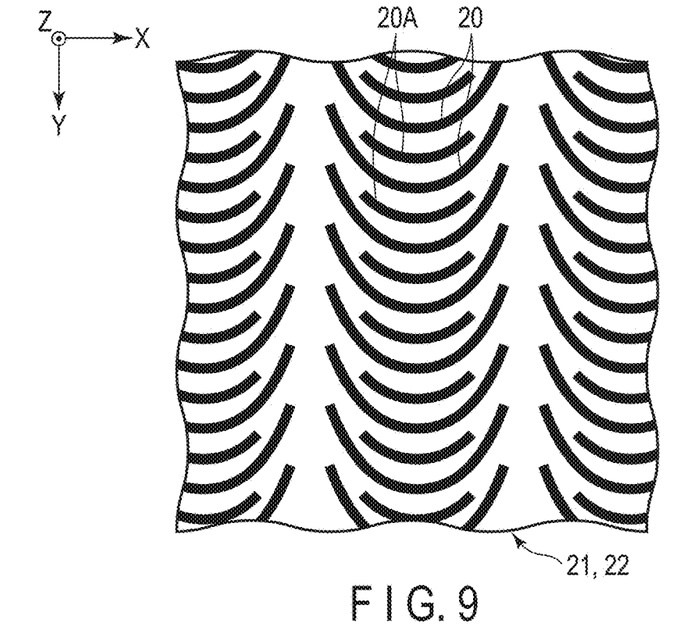
FIG. 9 is a plan view showing modified example 2 of the convex bodies.

FIG. 9 is a plan view showing modified example 2 of the convex bodies.

In modified example 2, convex bodies 20A whose entire lengths are shorter than the convex bodies 20 are provided in addition to the arch-like convex bodies 20 shown in FIG. 2. Each convex body 20A is formed into an arch-like shape. The convex bodies 20 and 20A are alternately arranged in the second direction Y.

Figure 10:
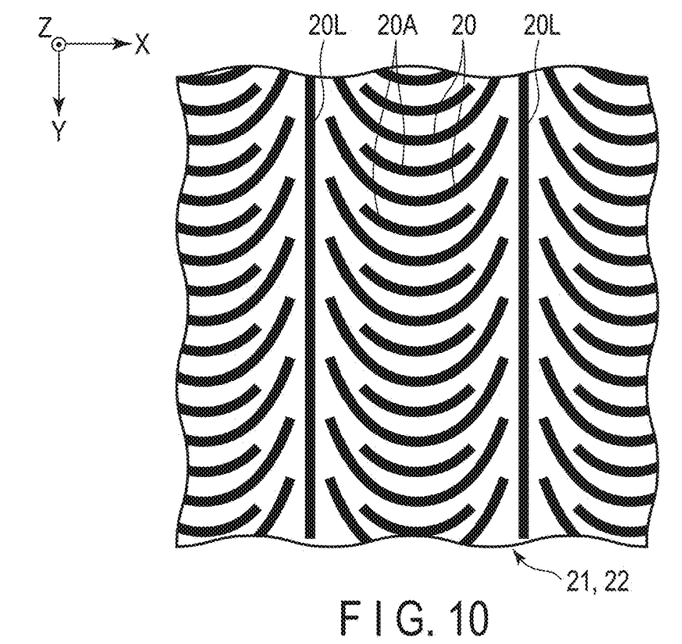
FIG. 10 is a plan view showing modified example 3 of the convex bodies.

FIG. 10 is a plan view showing modified example 3 of the convex bodies.

In modified example 3, convex bodies 20L which linearly extend in the second direction Y are provided in addition to the convex bodies 20 and 20A shown in FIG. 9. Each convex body 20L is located between the convex bodies 20 which are adjacent to each other in the first direction X.

Figure 11:
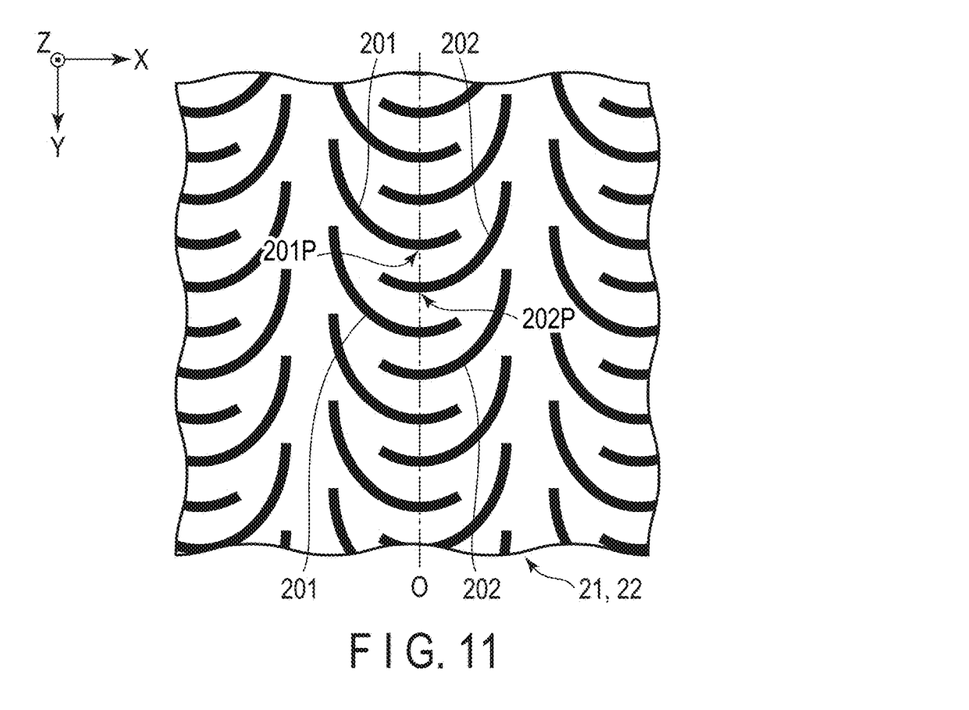
FIG. 11 is a plan view showing modified example 4 of the convex bodies.

FIG. 11 is a plan view showing modified example 4 of the convex bodies.

In modified example 4, convex bodies 201 and 202 which have different shapes are alternately arranged in the second direction Y. Each of the convex bodies 201 and 202 is formed into an arch-like shape. However, each of the convex bodies 201 and 202 has an asymmetric shape in the figure. It should be noted that the shape of each convex body 201 and the shape of each convex shape 202 are line-symmetric with respect to axis O parallel to the second direction Y.

In each convex body 201, when the position of peak 201P intersecting with axis O is regarded as the center, the right side in the figure is shorter than the left side in the figure. In each convex body 202, when the position of peak 202P intersecting with axis O is regarded as the center, the right side in the figure is longer than the left side in the figure.

Figure 12:
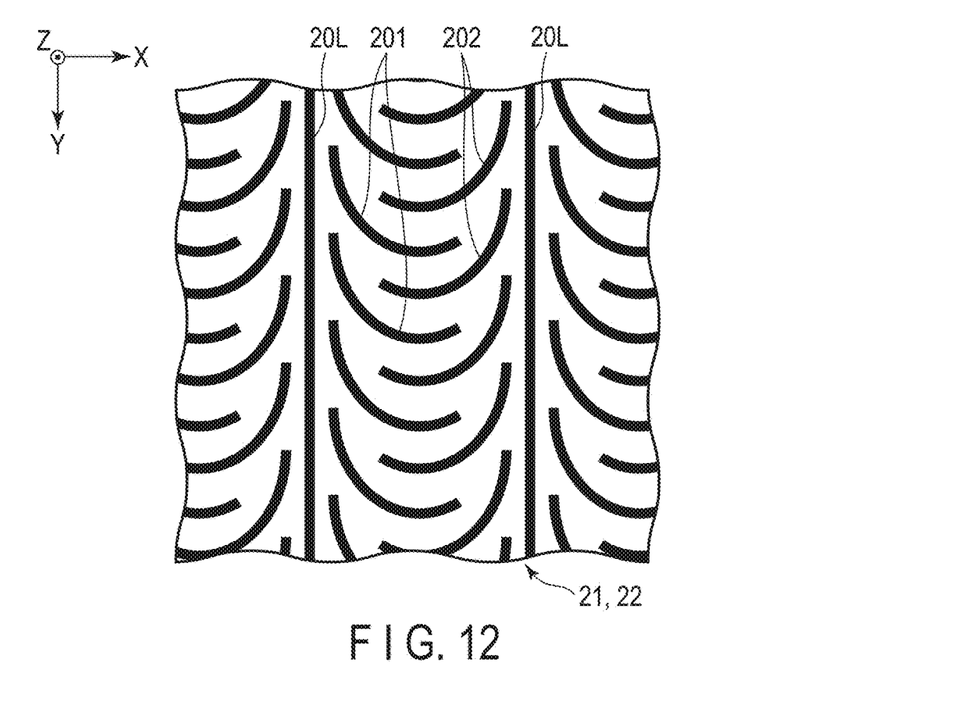
FIG. 12 is a plan view showing modified example 5 of the convex bodies.

FIG. 12 is a plan view showing modified example 5 of the convex bodies.

In modified example 5, convex bodies 20L which linearly extend in the second direction Y are provided in addition to the convex bodies 201 and 202 shown in FIG. 11. Each convex body 20L is located between the convex bodies 201 and 202 which are adjacent to each other in the first direction X. It should be noted that each convex body 20L is spaced apart from the convex bodies 201 and 202.

Figure 13:
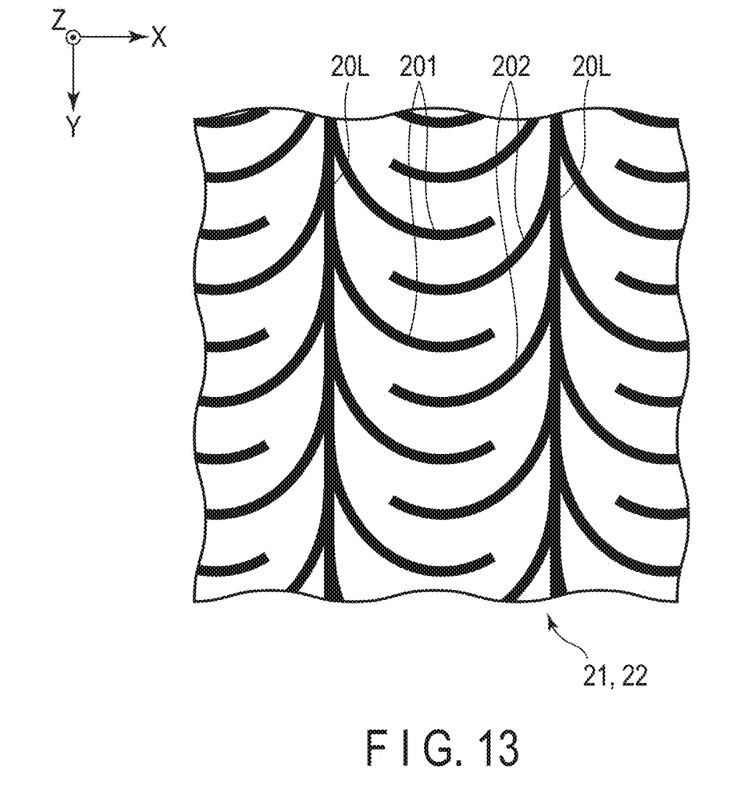
FIG. 13 is a plan view showing modified example 6 of the convex bodies.

FIG. 13 is a plan view showing modified example 6 of the convex bodies.

In modified example 6, the convex bodies 201, 202 and 20L shown in FIG. 12 are integrally formed.

Even if the modified examples shown in FIG. 8 to FIG. 13 are applied, effects similar to those described above are obtained.

Figure 14:
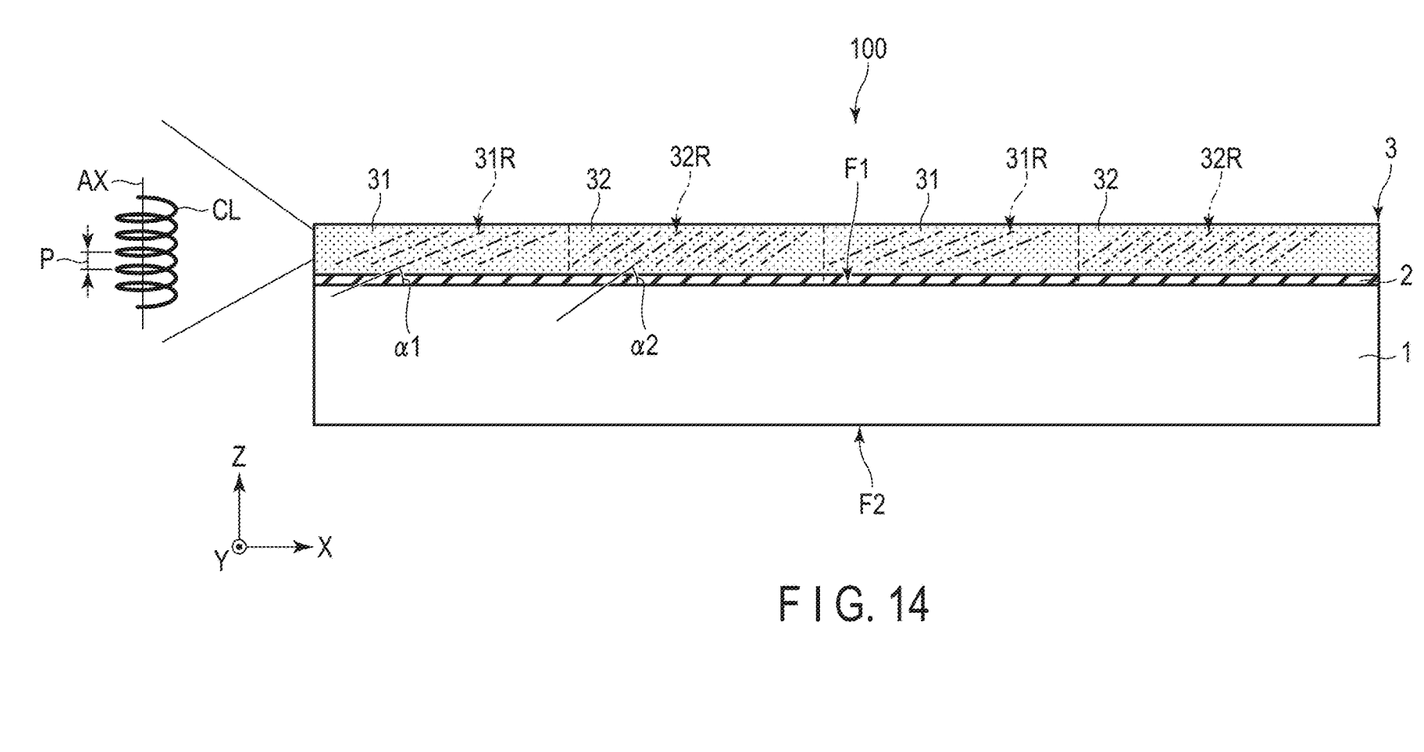
FIG. 14 is a cross-sectional view schematically showing another configuration example of the liquid crystal optical element 100.

FIG. 14 is a cross-sectional view schematically showing another configuration example of the liquid crystal optical element 100.

The configuration example shown in FIG. 14 is different from that shown in FIG. 1 in respect that the alignment control layer 2 is an optical alignment film which is subjected to alignment treatment by light irradiation. The liquid crystal optical element 100 does not comprise any tiny convex body between the transparent substrate 1 and the liquid crystal layer 3.

This alignment control layer 2 can be formed by, for example, the following method.

First, a solution for an alignment film is applied to the upper side of the transparent substrate 1 to form a thin film. Subsequently, alignment treatment for forming the pattern of alignment axes is applied to the thin film. In the alignment treatment, interference fringes are formed by circularly polarized light beams which rotate in directions opposite to each other, and the first area of the thin film is exposed by interfering light having the pattern of the interference fringes. By this process, the first alignment area 21 is formed. Subsequently, the second area of the thin film is exposed by interfering light having the pattern of different interference fringes. By this process, the second alignment area 22 is formed. Subsequently, the alignment axes are fixed by baking the thin film. By B this method, the alignment control layer 2 having the pattern of predetermined alignment axes is formed.

Even if an optical alignment film is applied as the alignment control layer 2, effects similar to those described above are obtained.

As explained above, the embodiments can provide a liquid crystal optical element in which a light guiding loss can be prevented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal optical element comprising:
a transparent substrate having a first main surface;
an alignment control layer which is provided on the first main surface and has a plurality of convex bodies; and
a liquid crystal layer which is provided on the alignment control layer and has a cholesteric liquid crystal, wherein
the alignment control layer has a first alignment area in which the convex bodies are arranged at a first pitch, and a second alignment area in which the convex bodies are arranged at a second pitch,
the second pitch is less than the first pitch,
the liquid crystal layer has a first liquid crystal area which overlaps the first alignment area and which has a first reflective surface inclining at a first angle relative to the first main surface, and a second liquid crystal area which overlaps the second alignment area and which has a second reflective surface inclining at a second angle relative to the first main surface, and
the second angle is greater than the first angle.

2. The liquid crystal optical element of claim 1, wherein each of the convex bodies has a curved shape in plan view.

3. The liquid crystal optical element of claim 1, wherein a height of each of the convex bodies is greater than a width of each of the convex bodies.

4. The liquid crystal optical element of claim 1, wherein a helical pitch of the cholesteric liquid crystal contained in the first liquid crystal area is equal to a helical pitch of the cholesteric liquid crystal contained in the second liquid crystal area.

5. The liquid crystal optical element of claim 1, wherein a width of the second alignment area is equal to a width of the first alignment area or greater than the width of the first alignment area.

6. The liquid crystal optical element of claim 1, wherein a width of the first alignment area is less than or equal to twice a length L1 defined by the following expression:

$$L1 = 2*d/\tan(\pi/2 - 2*\alpha 1),$$

where the first angle is α1, and a thickness of the transparent substrate is d, and a width of the second alignment area is less than or equal to twice a length L2 defined by the following expression:

$$L2 = 2*d/\tan(\pi/2 - 2*\alpha 2),$$

where the second angle is α2.

7. A liquid crystal optical element comprising:

a transparent substrate having a first main surface;

an alignment control layer provided on the first main surface; and a liquid crystal layer which is provided on the alignment control layer and has a cholesteric liquid crystal, wherein the liquid crystal layer has a first liquid crystal area which has a first reflective surface inclining at a first angle relative to the first main surface, and a second liquid crystal area which has a second reflective surface inclining at a second angle relative to the first main surface, a helical pitch of the cholesteric liquid crystal contained in the first liquid crystal area is equal to a helical pitch of the cholesteric liquid crystal contained in the second liquid crystal area, the second angle is different from the first angle, the alignment control layer includes a plurality of convex bodies, the convex bodies are arranged at a first pitch between the transparent substrate and the first liquid crystal area, the convex bodies are arranged at a second pitch between the transparent substrate and the second liquid crystal area, and the second pitch is different from the first pitch.

8. The liquid crystal optical element of claim 7, wherein the second pitch is less than the first pitch, and the second angle is greater than the first angle.

9. The liquid crystal optical element of claim 7, wherein the alignment control layer is an optical alignment film.

* * * * *